(12) United States Patent
Geprägs et al.

(10) Patent No.: US 6,599,996 B1
(45) Date of Patent: Jul. 29, 2003

(54) METHOD FOR (CO)POLYMERIZING POLAR AND NON-POLAR MONOMERS

(75) Inventors: Michael Geprägs, Lambsheim (DE); Joachim Queisser, Mannheim (DE); Jun Okuda, Ingelheim (DE); Kai Carsten Hultzsch, Cambridge, MA (US); Klaus Beckerle, Bodenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/130,820

(22) PCT Filed: Nov. 27, 2000

(86) PCT No.: PCT/EP00/11811

§ 371 (c)(1),
(2), (4) Date: May 23, 2002

(87) PCT Pub. No.: WO01/42314

PCT Pub. Date: Jun. 14, 2001

(30) Foreign Application Priority Data

Dec. 9, 1999 (DE) .......................... 199 59 252

(51) Int. Cl.$^7$ .............. C08F 4/72; C08F 297/06
(52) U.S. Cl. .............. 526/170; 526/113; 526/126; 526/134; 526/346; 526/347; 525/269; 525/299
(58) Field of Search ............ 526/126, 134, 526/170, 113, 346, 347; 525/269, 294, 299

(56) References Cited

U.S. PATENT DOCUMENTS

| | | | |
|---|---|---|---|
| 5,218,064 A | * 6/1993 | Yasuda et al. | 526/160 |
| 5,264,527 A | * 11/1993 | Varshney et al. | 525/299 |
| 5,464,906 A | 11/1995 | Patton | |
| 5,723,560 A | 3/1998 | Canich | |

FOREIGN PATENT DOCUMENTS

| | | |
|---|---|---|
| DE | 19700 305 | 7/1998 |
| EP | 634 429 | 1/1995 |
| WO | 97/35894 | 10/1997 |

OTHER PUBLICATIONS

Am.Chem.Soc.1994, Schaverien, XP–000925271.
Bull.Chem.Soc.Jpn.70, 1745–1767 (1997) Yasuda et al.
Am.Chem.Soc., Macomolecules 1988, 21,3356–3360, Ishihara.
J.Am.Chem.Soc.1994, 116, 4623–4640.
Lehrbuch der anorganischen Chemie, Hollemann–Wiberg, de Gruyter, Berline, 1985, S.59.
Xu, et al, "Synthesis of . . . Diblock Copolymers Containing s–PS and Polar Polymers," Macromol., 1999, 32, 8689–8692.*
Nakayama, et al, "Syndiospecific Polymerization of Methyl Methacrylate . . . ," Macromol., 1996, 29, 8014–8016.*

* cited by examiner

*Primary Examiner*—Fred Teskin
(74) *Attorney, Agent, or Firm*—Keil & Weinkauf

(57) ABSTRACT

In a process for the transition-metal-catalyzed preparation of polymers having a syndiotactic or predominantly syndiotactic structure from vinylaromatic monomers and a process for preparing block copolymers from vinylaromatic monomers and olefinically unsaturated polar monomers, use is made of transition metal compounds of the formula (I)

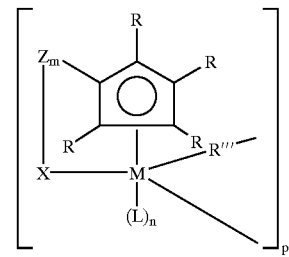

where the substituents and indices have the following meanings:

M is scandium, yttrium, lanthanum or a lanthanide metal,
R''' is $\mu$-$C_3$–$C_{20}$-alkyl,
L is a low molecular weight organic compound having Lewis basicity, where n=1 or 0 and at least one n in (I) is 0,
m is 1 or 2.

7 Claims, No Drawings

METHOD FOR (CO)POLYMERIZING POLAR AND NON-POLAR MONOMERS

The present invention relates to a process for the transition-metal-catalyzed preparation of polymers having a syndiotactic or predominantly syndiotactic structure from vinylaromatic monomers and to a process for preparing block copolymers from vinylaromatic monomers and olefinically unsaturated polar monomers. The invention further relates to the block copolymers obtained by the process mentioned and to their use as impact modifiers in the production of fibers, films or moldings. The invention also relates to fibers, films or moldings comprising the above-mentioned block copolymers.

Transition metal complexes based on rare earth metals have recently been examined to an increasing extent for their suitability as catalysts for the coordinative polymerization of nonpolar or polar olefinically unsaturated monomers (cf. H. Yasuda, E. Ihara, Bull. Chem. Soc. Jpn., 1997, 70, pp. 1745 to 1767). Depending on the monomer used in each case, use is made of metal complexes having one or two metal centers, with satisfactory results frequently only being achieved when a suitable cocatalyst is additionally used. According to Yasuda and Ihara, the polymerization of, for example, styrene can be carried out in the presence of a catalyst mixture comprising complexes of the formula $Sm(O-i-Pr)_3$ or $Nd(acac)_3$ and trialkylaluminum compounds. The polymerization of styrene was able to be carried out using the bimetallic complex $[(t-BuCp)_2NdMe]_2$ (Cp=cyclopentadienyl) in the absence of a cocatalyst. Although styrene could also be polymerized using monometallic samarium and lanthanum complexes without using a cocatalyst, only atactic polystyrene was obtained. Cocatalyst-free samarium or yttrium catalyst systems have hitherto displayed only a very low activity, if any, in the polymerization of styrene. To prepare syndiotactic polystyrene or polystyrene having a high syndiotactic content, the advice has hitherto been to use catalyst systems comprising cyclopentadienyltitanium complexes and suitable aluminoxane compounds (cf. Ishihara et al., Macromolecules, 1988, 21, p. 3356).

Syndiotactic polystyrene, i.e. polystyrene having an rr triad content of >70%, is suitable for use as a thermoplastic material owing to its good mechanical properties and its thermal stability. However, since syndiotactic polystyrene is frequently not compatible with other polymeric materials, it would be desirable to be able to prepare suitable blends with the aid of compatibilizers so as to combine the advantageous properties of different polymer materials in one material. Block copolymers and graft copolymers have proven to be useful as compatibilizers and impact modifiers in polymer blends. Block copolymers can be obtained, for example, by means of anionic polymerization, in which the coupling of two or more copolymer blocks comprising nonpolar monomer units, e.g. butadiene and styrene, is unproblematical but the block copolymerization of styrene and polar monomers, e.g. acrylates, has not been able to be brought about.

Wakatsuki et al. (Macromolecules 1998, 31, pp. 8650 to 8652) were able to obtain block copolymers comprising polystyrene and polyethylene blocks with the aid of a monocyclopentadienylsamarium phenoxide complex. However, the incorporation of block components comprising polar monomer units is not described. Although Yasuda et al., Bull. Chem. Soc. Jpn. 1997, 70, pp. 1745 to 1767, show that block copolymers of ethene and polar monomers such as methyl methacrylate can be prepared in the presence of binary hydride-bridged samarium complexes, the monometallic and bimetallic complexes described are not suitable for the block copolymerization of styrene with polar monomers. In addition, Yasuda et al. disclose the preparation of polystyrene having an increased syndiotactic content using defined neodymium complexes in the presence of aluminum alkyl compounds as coactivators. Many further lanthanide complexes gave only atactic polystyrene when no cocatalysts were employed.

According to EPA 0 634 429, only block copolymers made up of polyolefin blocks and blocks consisting of polar monomer units can be prepared in the presence of defined biscyclopentadienyllanthanum complexes, i.e. in the absence of a cocatalyst. Schaverien, Organometallics, 1994, 13, pp. 69 to 82, describe numerous dimeric alkyl- and hydride-bridged lanthanide complexes in terms of their preparation and properties. However, these compounds display polymerization activity only toward α-olefins.

It would be desirable to have a process for preparing block copolymers which enables not only nonpolar monomers such as olefins but also vinylaromatic monomers to be copolymerized with polar monomer units.

It is an object of the present invention to provide a preparatively simple block copolymerization process for preparing block copolymers comprising vinylaromatic and polar monomer units.

We have found that this object is achieved by a process for the transition-metal-catalyzed preparation of block copolymers, in which vinylaromatic monomers and olefinically unsaturated polar monomers are polymerized sequentially in the presence of a transition metal compound of the formula (I)

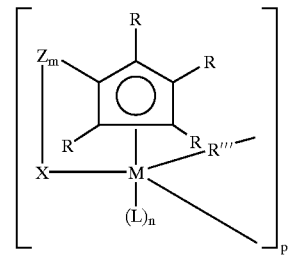

where the substituents and indices have the following meanings:

M is scandium, yttrium, lanthanum or a lanthanide metal,

R is hydrogen, halogen, $C_1$–$C_{20}$-alkyl, $C_3$–$C_{10}$-cycloalkyl, $C_6$–$C_{15}$-aryl or $C_3$–$C_{30}$-organosilyl, where two adjacent radicals R may form a saturated or unsaturated, cyclic or heterocyclic group having from 4 to 18 carbon atoms, Z is —SiR'$_2$—, —CR'$_2$—, —GeR'$_2$—, —SnR'$_2$—, —BR'— or —O—, R' is $C_1$–$C_{20}$-alkyl, $C_3$–$C_{10}$-cycloalkyl, $C_6$–$C_{15}$-aryl or alkylaryl having from 1 to 10 carbon atoms in the alkyl part and from 6 to 10 carbon atoms in the aryl part, X is —O—, —S—, —NR"—, —PR"—, —OR", —SR", —NR"$_2$ or —PR"$_2$, R" is hydrogen, $C_1$–$C_{20}$-alkyl, $C_3$–$C_{10}$-cycloalkyl, $C_6$–$C_{15}$-aryl, alkylaryl having from 1 to 10 carbon atoms in the alkyl part and from 6 to 10 carbon atoms in the aryl part or $C_3$–$C_{30}$-organosilyl, R'" is $\mu$-$C_3$–$C_{20}$-alkyl, p is a natural number greater than 1, L is a low molecular weight, organic compound having Lewis basicity, n=1 or 0 and at least one n in (I) is 0, m is 1 or 2.

Preference is given to using metal hydride complexes (I) in which the substituents and indices have the following meanings:

M is yttrium, terbium or erbium

R is $C_1$–$C_{10}$-alkyl or $C_3$–$C_{21}$-organosilyl, where two adjacent radicals R may also form a fused-on aromatic ring, Z is —SiR'$_2$— or —CR'$_2$—, R' is $C_1$–$C_{10}$-alkyl or $C_6$–$C_{10}$-aryl, m is 1, X is —NR"— or —PR"—, R" is $C_1$–$C_{10}$-alkyl, $C_6$–$C_{10}$-aryl or alkylaryl having from 1 to 6 carbon atoms in the alkyl part and from 6 to 10 carbon atoms in the aryl part and R'" is $\mu$-$C_4$–$C_{10}$-alkyl, p is a natural number greater than 1

L is tetrahydrofuran, a 2,5-dialkyltetrahydrofuran, dioxane, a dialkyl ether, acetonitrile, a triarylphosphine or halogenated triarylphosphine.

Furthermore, we have found a process for preparing polymers of vinylaromatic monomers having a syndiotactic or predominantly syndiotactic structure, in which the starting monomers are polymerized in the presence of the abovementioned transition metal compound (I). In addition, the block copolymers obtainable by the abovementioned process and their use as impact modifiers or compatibilizers have been found. Finally, fibers, films and moldings comprising essentially the block copolymers mentioned have also been found.

In the processes of the present invention, use is made of binuclear or polynuclear complexes (I) based on rare earth metals. Suitable central metals M are accordingly scandium, yttrium, lanthanum or lanthanide metals such as cerium, praseodymium, neodymium, promethium, samarium, europium, gadolinium, terbium, dysprosium, holmium, erbium, thulium, ytterbium and lutetium (Cf. Lehrbuch der anorganischen Chemie, Hollemann-wiberg, de Gruyter, Berlin, 1985, p. 59). Preference is given to using yttrium, lanthanum, lutetium and ytterbium, particularly preferably terbium and erbium as central metal M.

Suitable monoanionic $\eta^5$-bonded cyclic ligands bearing the substituent —$(Z_m)$— are not only cyclopentadienyl (R=H) but also singly negatively charged five-membered aromatic carbocycles which are substituted not only by the radical Z but also by one or more radicals R, for example by halogen such as fluorine, chlorine or bromine, linear or branched $C_1$–$C_{20}$-alkyl, preferably $C_1$–$C_{10}$-alkyl such as methyl, ethyl, n-propyl, i-propyl, n-butyl or t-butyl, $C_3$–$C_{10}$-cycloalkyl, preferably $C_3$–$C_7$-cycloalkyl such as cyclopropyl or cyclohexyl, or $C_6$–$C_{15}$-aryl, preferably $C_6$–$C_{10}$-aryl such as phenyl or naphthyl. Suitable aryl substituents include, for example, $C_6$–$C_{15}$-aryl, preferably $C_6$–$C_{10}$-aryl, substituted by $C_1$–$C_6$-alkyl such as methyl or i-propyl or by halogen such as fluorine, chlorine or bromine. Two adjacent radicals R may also together form a saturated or unsaturated, cyclic or heterocyclic group having from 4 to 18, preferably from 4 to 15, carbon atoms. Such groups also include, for example, fused-on aryl units. Accordingly, indenyl, fluorenyl or benzindenyl systems are likewise suitable monoanionic $\eta^5$-bonded cyclic ligands.

Further possible radicals R are $C_3$–$C_{30}$—, preferably $C_3$–$C_{21}$-organosilyl groups, —Si(R*)$_3$. The radicals R* can be, independently of one another, $C_1$–$C_{10}$-alkyl, preferably $C_1$–$C_7$-alkyl, e.g. methyl, ethyl or i-propyl, $C_3$–$C_{10}$-cycloalkyl, preferably $C_3$–$C_7$-cycloalkyl, e.g. cyclopropyl or cyclohexyl, $C_6$–$C_{10}$-aryl, preferably phenyl, or alkylaryl having from 1 to 4 carbon atoms in the alkyl part and from 6 to 10 carbon atoms in the aryl part, for example benzyl.

The radicals R in a compound (I) can be either identical or different.

Among the abovementioned compounds, particularly suitable $\eta^5$-bonded ligands complexing the metals M are ones derived from cyclopentadienyl, tetra-$C_1$–$C_6$-alkylcyclopentadienyl, indenyl, fluorenyl or benzindenyl, where the three latter ligands may also be monosubstituted or polysubstituted by $C_1$–$C_6$-alkyl groups. As radicals bearing the substituent Z, preference is given to cyclopentadienyl, tetra-$C_1$–$C_4$-alkylcyclopentadienyl, indenyl, benzindenyl and indenyl or benzindenyl substituted by from 1 to 3 $C_1$–$C_4$-alkyl groups. Particular preference is given to cyclopentadienyl, tetramethylcyclopentadienyl or indenyl, in particular tetramethylcyclopentadienyl, substituted by the radical Z. Complexes (I) which have identical $\eta^5$-bonded ligands are usually employed. However, these ligands can also differ from one another in terms of their ring system as such and/or their ring substitution pattern.

Suitable radicals Z are bivalent structural units based on monoatomic bridge members whose free valences likewise bear organic radicals R'. Suitable bridge members are, for example, silyl (—SiR'$_2$—), alkyl (—CR'$_2$—), germanyl (—GeR'$_2$—), stannyl (—SnR'$_2$—), boranyl (—BR'—) or oxo (—O—) groups. It is also possible for two units Z bonded covalently to one another (m=2) to form a bridge segment between the monoanionic, $\eta^5$-bonded ligands and the unit X. In such a bridge segment, Z does not, of course, necessarily have to be present in the form of two identical structural units. Possible two-membered bridge segments are, in particular, the systems —SiR'$_2$—SiR'$_2$—, —SiR'$_2$—CR'$_2$—, —CR'$_2$—CR'$_2$—, —CR'=CR'—, —O—CR'$_2$— and —O—SiR'$_2$—. However, preference is given to using bridge segments having a single bridging atom (m=1), in particular the systems —SiR'$_2$— and —CR'$_2$—. The radicals R' can be $C_1$–$C_{20}$-alkyl, preferably $C_1$–$C_{10}$-alkyl, for example methyl, ethyl or i-propyl, $C_3$–$C_{10}$-cycloalkyl, preferably $C_3$–$C_7$-cycloalkyl, for example cyclohexyl, $C_6$–$C_{15}$-aryl, preferably $C_6$–$C_{10}$-aryl, in particular phenyl, or alkylaryl having from 1 to 10 carbon atoms in the alkyl part and from 6 to 10 carbon atoms in the aryl part, for example benzyl. Among the radicals Z, particular preference is given to di-$C_1$–$C_7$-alkyl-substituted silyl groups such as dimethylsilyl, diethylsilyl or di-i-propylsilyl.

Possible units X are, for example, the oxo (—O—), thio (—S—), amido (—NR"—) or phosphido (—PR"—) groups. These groups are generally bound to the metal center M via a $\eta^1$-bond. X may also be an uncharged two-electron donor such as —O", —SR", —NR"$_2$ or —PR"$_2$. The latter groups X are usually coordinately bonded to the metal center M via a free electron pair. X is preferably an oxo or thio group, particularly preferably an amido unit. As substituents R" in the radicals —NR"—, —PR"—, —OR", —SRO", —NR"$_2$ or —PR"$_2$, use is generally made of hydrogen, $C_1$–$C_{20}$-alkyl, $C_3$–$C_{10}$-cycloalkyl, $C_6$–$C_{15}$-aryl, alkylaryl having from 1 to 10 carbon atoms in the alkyl part and from 6 to 10 carbon atoms in, the aryl part or $C_3$–$C_{30}$-organosilyl. Particularly suitable radicals R" are bulky groups such as $C_3$–$C_{10}$-alkyl groups, for example i-propyl or t-butyl, $C_6$–$C_{10}$-aryl groups such as phenyl or substituted phenyl, and alkylaryl groups having from 1 to 6 carbon atoms in the alkyl part and from 6 to 10 carbon atoms in the aryl part, for example benzyl. A particularly frequently used unit X is —N(t-butyl-) or —N(1,1-dimethylpropyl).

Radicals R'" include linear and branched alkyl radicals. These may also be substituted by one or more inert functional groups such as fluorine, nitro or nitrile. Preference is given to using $C_3-C_{20}-$, in particular $C_4-C_{10}$-alkyl radicals, with linear alkyl radicals being particularly preferred. Examples of suitable alkyl radicals are ethyl, n-propyl, n-butyl, n-pentyl, n-hexyl, n-heptyl, n-octyl, n-nonyl, n-decyl, n-dodecyl, n-hexadecyl and n-eicosyl. n-Hexyl is particularly suitable as radical R'''. The radicals R''' in a compound (I) may be identical or different. A compound (I) usually has identical radicals R'''. The radical R''' is, preferably via the carbon atom located at the chain end of the alkyl radical, bound via $\mu$ bonds to the two metal centers of the binuclear metal complex.

In the binuclear or polynuclear metal complexes (I), the ligands and radicals R, R', R'', R''', L, Z and X and also the central metal M and the $\eta^5$-bonded ligand system which each occur twice or more in a complex can each have identical or different meanings in a compound (I). In general, the ligands, the radicals and the central metals M each have identical meanings.

The polymerization-active transition metal compounds (I) used in the processes of the present invention are coordinatively unsaturated, i.e. the metal centers are present as 16 electron species in the transition metal compound (the ligand coordination site L remains unoccupied), either on all p metal centers or on at least one metal center of the complex. Preference is given to those transition metal compounds (I) in which the ligand coordination site L remains unoccupied on all or on almost all metal centers. In principle, a polymerization-active complex is obtained only if a metal center which is coordinatively unsaturated is present in (I). Of course, the processes of the present invention also encompass those catalyst systems in which different abovementioned transition metal compounds are present together. Furthermore, additional binuclear or polynuclear metal complexes in which all metal centers bear a coordinated ligand L may also be present.

If L does not represent an unoccupied metal coordination site, L is a low molecular weight organic Lewis base, i.e. a compound which has a two-electron donor. In these cases, the ligand L is, for example, tetrahydrofuran, a 2,5-dialkyltetrahydrofuran such as 2,5-dimethyltetrahydrofuran, dioxane, a dialkyl ether such as dimethyl ether or diethyl ether, acetonitrile, a triarylphosphine, in particular triphenylphosphine, or a partially halogenated or perhalogenated triarylphosphine such as tris(p-fluorophenyl) phosphine or tris(pentafluorophenyl)phosphine.

Examples of preferred metal-alkyl complexes are $[Y(\eta^5:\eta^1-C_5Me_4 \ SiMe_2 \ NCMe_3)(\mu-R''')]_2$, $[Tb(\eta^5:\eta^1-C_5Me_4 \ SiMe_2 \ NCMe_3)(\mu-R''')]_2$ and $[Sc(\eta^5:\eta^1-C_5Me_4 \ SiMe_2 \ NCMe_3)(\mu-R''')]_2$ where R''' is i-butyl and/or i-propyl, preferably n-butyl, n-octyl and/or n-decyl, and also the complex $[CP^*Y(OC_6H_3-2,6-t-BU_2)]_2(\mu-H)(\mu-R''')$ where R''' is ethyl, i-propyl, i-butyl or n-hexyl (Cp*= pentamethylcyclopentadienyl). Yttrium complexes (I) are preferably present in the binuclear form (p=2).

The transition metal compound or catalyst system on which the processes of the present invention are based can be obtained starting from transition metal compounds in which a ligand L, e.g. in the form of a low molecular weight uncharged Lewis base, is always coordinated to the metal centers of the binuclear or polynuclear complex (in complexes (I), n is then 1 for all p metal centers of (I)), by application of reduced pressure. 50–60% of the coordinately bonded ligand L can usually be removed at a reduced pressure of $5\times10^{-3}$ mm of Hg for one hour, as a result of which the starting complex described is converted into the polymerization-active compounds (I).

The processes of the present invention can accordingly be carried out in the presence of transition metal compounds (I) in which n=0 for at least one metal center p, i.e. at least one metal center is coordinatively unsaturated, viz. the free coordination site is not occupied by an electron donor compound. It is also possible to use any mixtures of transition metal compounds (I) in which complexes having one, more than one or p unsaturated metal centers are present side by side. Furthermore, the success of the processes of the present invention is not adversely affected when not only the polymerization-active transition metal compounds (I) but also compounds in which all p metal centers are coordinatively saturated by electron donor ligands L are present. Although the latter compounds do not participate in the reaction, they can be converted when required into the active catalyst species by brief application of reduced pressure, even during the polymerization process. This makes it possible, even during the course of the polymerization, to influence the polymerization activity in a simple manner by increasing the concentration of active polymerization catalyst without requiring an external addition of catalyst.

The starting complexes (Ia) (n=1 for all p metal centers in (I)) on which the polymerization-active transition metal compounds (I) are based can be prepared from the corresponding binuclear bishydride-bridged metal complexes (Ib) (R'''=H, p=2) by reaction with 1-olefins, in particular $C_3-C_{20}$-1-olefins. 1-Hexene, 1-octene, 1-decene or mixtures thereof are preferably used. Quantitative reaction can usually be achieved in about 2–24 hours when using two equivalents of 1-olefin, based on the binuclear transition metal starting compound, even at room temperature. The reaction to give alkyl-bridged binuclear and/or polynuclear transition metal complexes can be accelerated further by use of an excess of 1-olefins. The preparation of the abovementioned transition metal compounds can likewise be carried out at elevated temperatures, e.g. at 60° C. and above, without polymerization of 1-olefins being observed. The compounds (Ia) normally have $C_{2h}$ symmetry.

The binuclear bishydride-bridged transition metal compounds (Ib) are generally obtained by hydrogenative treatment of mononuclear metal complexes of the formula (II)

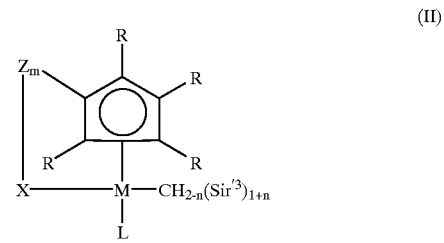

(II)

where n=0 or 1 and the other substituents and indices have the general and preferred meanings described above.

The preparation of the binuclear complexes (Ib) is usually carried out in the presence of hydrogen under a pressure in the range from 1.5 to 100 bar, preferably in the range from 2 to 20 bar, and at a temperature in the range from 0 to 100° C., preferably from 10 to 80° C. At reaction times in the range from 2 to 24 hours, even at times of less than 10 hours, the desired metal complex is usually obtained in high yield, possibly in the form of an isomer mixture. In general, the preparation of the binuclear complexes (Ib) is carried out in inert solvents, for example a low molecular weight aliphatic hydrocarbon such as n-pentane, n-hexane or cyclohexane, an aromatic hydrocarbon such as benzene, toluene or xylene or a halogenated hydrocarbon such as dichloromethane or chloroform. Preference is given to using aliphatic hydrocarbons such as n-pentane and n-hexane. Complexes of the formula (I) are thermally very stable and display no CH-activation or H/D exchange with deuterated solvents even at 50° C. Mononuclear complexes of the formula (II) can be readily obtained, for example from compounds of the type $Y[CH_{2-n}(SiMe_3)_{1+n}]_3$ (IIa), by reaction with compounds such as $[C_5R_4(H)(SiR'_2—XH)]$ (IIb), e.g. $[C_5Me_4(H)(SiMe_2NH-t-Bu)]$. At a reaction temperature in the range from −20 to 50° C., reaction times of from 1 to 5 hours are usually sufficient to achieve quantitative yields in aliphatic solvents such as n-hexane.

The novel metal complex (I) defined above can be used either as such or in the form of any mixture of compounds of the formula (I) as catalyst for the polymerization of vinylaromatic monomers or for the copolymerization of vinylaromatic monomers with polar monomers, in particular polar olefinically unsaturated monomers.

Suitable vinylaromatic monomers are essentially all monocyclic or polycyclic aromatic compounds which have one or more vinyl groups. The aromatic ring systems of these compounds can likewise be heteroaryl and contain, for example, one or more heteroatoms such as O, S and/or N as ring atoms. Furthermore, the ring systems can be substituted by any functional groups. Preferred vinylaromatic compounds are monocyclic or bicyclic, unsubstituted or alkyl- or halogen-substituted, aromatic or heteroaromatic ring systems made up of from 5 to 10 ring atoms including 0, 1, 2 or 3 heteroatoms. Nitrogen is preferred as heteroatom. Suitable heteroaromatic vinyl compounds are, for example, 2-vinylpyridine or 4-vinylpyridine. Suitable polycyclic vinylaromatic compounds are 4-vinylbiphenyl or 4-vinylnaphthalene.

Particularly useful vinylaromatic monomers are compounds of the formula (III)

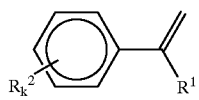

(III)

where $R^1$ is hydrogen $C_1–C_8$-alkyl or a halogen atom and $R^2$ is $C_1–C_8$-alkyl or a halogen atom and k is 0, 1, 2 or 3. Particularly suitable vinylaromatic monomers (III) are styrene, α-methylstyrene, o-, m-, p-methylstyrene, p-ethylstyrene, 3-vinyl-o-xylene, 4-vinyl-o-xylene, 2-vinyl-m-xylene, 4-vinyl-m-xylene, 5-vinyl-m-xylene, 2-vinyl-p-xylene or any mixtures of the abovementioned vinylaromatic compounds. Particular preference is given to using styrene as vinylaromatic monomer.

For the purposes of the present invention, polar olefinically unsaturated monomers include vinyl cyanides such as acrylonitrile or methacrylonitrile, in particular acrylonitrile, and also acrylic acid and the $C_1–C_{20}$-alkyl and $C_6–C_{15}$-aryl esters of acrylic acid, likewise methacrylic acid and the $C_1–C_{20}$-alkyl and $C_6–C_{15}$-aryl esters of methacrylic acid or mixtures thereof. Suitable acrylates are, in particular, methyl, ethyl, propyl, n-butyl, t-butyl-, 2-ethylhexyl, glycidyl and phenyl acrylate, and particularly suitable methacrylates are methyl, ethyl, propyl, n-butyl, t-butyl, 2-ethylhexyl, glycidyl and phenyl methacrylate. Particularly preferred polar monomers are acrylonitrile, n-butyl acrylate, t-butyl acrylate, 2-ethylhexyl acrylate and glycidyl acrylate and also mixtures thereof. In particular, use is made of t-butyl acrylate.

In the process of the present invention for preparing block copolymers, it is likewise possible to mix further nonpolar α-olefinically unsaturated monomers which are not vinylaromatic monomers with the vinylaromatic monomers or to react these α-olefins sequentially with the vinylaromatic monomer units to form essentially nonpolar structural blocks. Suitable α-olefinic monomers are, for example, unsaturated hydrocarbons such as ethene, propene, 1-butene, i-butene, 1-pentene, 2-pentene, 1-hexene or any mixtures of the abovementioned olefins.

The polymerization of vinylaromatic monomer units and the block copolymerization of vinylaromatic monomer units with polar olefinically unsaturated monomers in the presence of transition metal compounds of the formula (I) can be carried out either in bulk or in solution. If the polymerization is carried out in solution, preference is given to using aprotic solvents. For example, it is possible to use aliphatic hydrocarbons such as pentane, hexane or cyclohexane, aromatic hydrocarbons such as benzene, toluene, xylene or ethylbenzene or halogenated hydrocarbons such as dichloromethane. Preference is given to using aromatic hydrocarbons, in particular toluene. Of course, it is also possible to use any mixtures of the abovementioned solvents.

In the process of the present invention for preparing block copolymers, one or more blocks of vinylaromatic monomer units and, if desired, nonpolar α-olefinic monomer compounds are formed first, after which one or more blocks of the polar olefinically unsaturated monomers are polymerized on by addition of these components. Here, it is possible for either the entire process of the block copolymer preparation to be carried out in bulk or for only, for example, the preparation of the nonpolar vinylaromatic block to be carried out in bulk.

The starting concentration of each monomer added is generally set to a value in the range from 0.001 to 10 mol/l, preferably from 0.01 to 8 mol/l. The polymerization temperature can be varied over a wide range. The temperature chosen is usually in the range from −70 to 100° C., preferably below 80° C. and particularly preferably in the range from +10 to 60° C. The polymerization time for the processes of the present invention is generally in the range from 0.5 to 75 hours. Average reaction times in the range from 1 to 50 hours have been found to be useful.

The polymerization reactions can be carried out at pressures in the range from 0.001 to 50 bar. The polymerization is usually carried out at pressures in the range from 0.5 to 10 bar; a polymerization carried out under atmospheric pressure normally gives a satisfactory result. The ratio of starting monomer to transition metal compound (I) is generally in the range from 1:1 to 10,000:1, preferably from 5:1 to 5000:1 and in particular from 40:1 to 5000:1.

The polymerization processes of the present invention are preferably carried out under inert reaction conditions, i.e. with exclusion of oxygen and moisture. If desired, a protective gas such as argon or nitrogen can be used.

To start the polymerization, the transition metal compound (I) can be added to the vinylaromatic monomer or to a solution of the vinylaromatic monomer, or the complex (I) can be initially charged as such or in dissolved form. The polymerization or block copolymerization processes of the present invention do not normally require the addition of further coactivators or cocatalysts.

If exclusively vinylaromatic monomer compounds and, if desired, further nonpolar olefinically unsaturated monomer units are reacted in the presence of the metal alkyl complex (I), polymers having a syndiotactic or largely syndiotactic structure are normally obtained. The proportion of rr triads is preferably above 55%, particularly preferably above 62%. Polymers having a syndiotacticity of over 90% can also be readily obtained. At the same time, molecular weights $M_n$ in the range from 3000 to 500,000 g/mol, preferably >10,000 g/mol, are obtainable. The polydispersities ($M_w/M_n$) obtained are generally less than 3.0, but are preferably less than 2.0.

The polymerization reactions are generally stopped by addition of a protic compound, for example a low molecular weight alcohol such as methanol, ethanol or i-propanol, or by simply removing the solvent. The (co)polymer formed is generally obtained as a solid and can be separated off mechanically, e.g. by means of filtration. The polymers and block copolymers obtained by the process described are suitable for producing fibers, films or moldings.

The block copolymers comprising vinylaromatic and polar blocks obtainable by the process of the present invention can be used, for example, as impact modifiers in thermoplastic polymers or in polymer blends. The block copolymers of the present invention can also be used as compatibilizers in polymer mixtures of otherwise immiscible polymers. Block copolymers in which the vinylaromatic block has a syndiotactic or predominantly syndiotactic structure can be used, for example, for compatibilizing blend materials comprising syndiotactic polystyrene and polyacrylates and/or polymethacrylates. The vinylaromatic polymers obtained by the process of the present invention have, like the block copolymers described, a very narrow molecular weight distribution. Polydispersities of less than 2.0 and even 1.4 can readily be obtained.

The invention is illustrated by the Examples below.

EXAMPLES

The molecular weights of the homopolymers and block copolymers prepared were determined by means of quantitative $^1$H-NMR spectroscopy by end group analysis and also by means of gel permeation chromatography against a polystyrene standard using columns from Shodex and tetrahydrofuran as eluant.

DSC measurements were carried out using a Netzsch DSC 204 instrument.

The $^1$H-NMR, $^{13}$C-NMR and $^{29}$Si-NMR spectroscopic studies were carried out using a Bruker DRX 400 instrument.

Styrene was refluxed for a number of hours over calcium hydride, and then distilled shortly before use. Toluene was refluxed in the presence of sodium and then distilled.

The transition metal complexes were prepared using protective gas techniques. The reactions were carried out under argon.

I) Preparation of a Binuclear Yttrium Hydride Complex a) Preparation of Y(CH$_2$SiMe$_3$)$_3$(THF)$_2$ Yttrium chloride (586 mg) was taken up in tetrahydrofuran (THF) (30 ml) and stirred at 55° C. for 30 minutes. The solvent was removed by distillation and the solid residue was admixed with hexane (40 ml) and THF (0.3 ml). At −78° C., a solution of LiCH$_2$SiMe$_3$ (856 mg) in hexane (20 ml) was added and the resulting suspension was stirred at 0° C. for 1.5 hours. Filtration of the reaction mixture gave Y(CH$_2$SiMe$_3$)$_3$(THF)$_2$ in the form of colorless microcrystals. $^1$H-NMR(C$_6$D$_6$, 25° C.): δ=−0.71 (d, $^2$J(Y,H)=2.3 Hz, 6H; Y—CH$_2$), 0.27 (s, 27H; SiCH$_3$), 1.30 (m, 8H; β-CH$_2$), 3.93 (m, 8H; α-CH$_2$); $^{13}$C-NMR (C$_6$D$_6$, 25° C.): δ=4.6 (SiCH$_3$), 25.0 (β-CH$_2$), 33.7 (d, $^1$J(Y,C)=35.7 Hz, Y—CH$_2$), 70.8 (β-CH$_2$).

b) Preparation of [(N-t-Bu)(SiMe$_2$)(C$_5$Me$_4$)]Y(CH$_2$SiMe$_3$)(THF) (II)

A solution of [C$_5$Me$_4$(H)(SiMe$_2$NHt-Bu)] (186 mg) in hexane (5 ml) was added at 0° C. to a solution of Y(CH$_2$SiMe$_3$)$_3$(THF)$_2$ (365 mg) in pentane (10 ml), and the mixture was stirred for 2 hours at this temperature. The reaction solution was decanted and evaporated under reduced pressure, and the desired product was obtained by means of crystallization from cold pentane (−30° C.) in the form of colorless microcrystals (320 mg). ([C$_5$Me$_4$(H)(SiMe$_2$NHt-Bu)] was prepared by a method described by Shapiro et al., J. Am. Chem. Soc. 1994, 116, p. 4623). $^1$H-NMR: δ=−0.93 (d, $^2$J(Y,H)=3.1 Hz, 2H; Y—CH$_2$), 0.28 (s, 9H, CH$_2$SiCH$_3$), 0.74 (s, 6H, SiCH$_3$), 1.08 (br s, 4H, β-CH$_2$), 1.38 (s, 9H, C(CH$_3$)$_3$), 2.04, 2.19 (s, 6H, C$_5$Me$_4$), 3.36 (br s, 4H, α-CH$_2$); $^{13}$C-NMR δ=4.7 (CH$_2$SiCH$_3$), 8.4 (NSiCH$_3$), 11.5, 14.0 (C$_5$Me$_4$), 24.7 (β-CH$_2$), 26.2 (d, $^1$J(Y,C)=44.9 Hz, Y—CH$_2$), 36.0 (C(CH$_3$)$_3$), 54.0 (C(CH$_3$)$_3$), 70.7 α-CH$_2$), 106.6 (C$_5$Me$_4$ C—SiCH$_3$), 122.3, 126.4 (C$_5$Me$_4$); 29Si-NMR: δ=−25.0 (NSiMe$_2$), −2.7 (d, $^2$J(Y,Si)=1.9 Hz, CH$_2$SiMe$_3$).

c) Preparation of {Y[η$^5$:η$^1$-C$_5$Me$_4$SiMe$_2$(N-t-Bu)](μ-H)(THF)}$_2$ (Ib)

A solution of [(N-t-Bu)(SiMe$_2$)(C$_5$Me$_4$)]Y(CH$_2$SiMe$_3$)(THF) (630 mg) in pentane (10 ml) was stirred under a hydrogen pressure of 4 bar for 7 hours at room temperature. The binuclear yttrium hydride complex was obtained as a white solid in a yield of 64%. $^1$H-NMR ([D$_8$]toluene, 50° C.): δ=0.69 (s, 6H, SiCH$_3$), 1.36 (s, 9H, C(CH$_3$)$_3$, 1.46 (br m, 4H, β-CH$_2$), 2.09, 2.22 (s, 6H, C$_5$Me$_4$), 3.82 (br m, 4H, α-CH$_2$), 5.50 (t, 1H, $^1$J(Y,H)=28.8 Hz, YHY); $^{13}$C-NMR ([D$_8$]toluene, 50° C.): δ=8.6 (SiCH$_3$), 12.2, 14.3 (C$_5$Me$_4$), 25.2 (β-CH$_2$), 36.8 (C(CH$_3$)$_3$), 55.0 (C(CH$_3$)$_3$, 72.1 (α-CH$_2$), 108.5 (C$_5$Me$_4$C—SiCH$_3$), 125.8 (C$_5$Me$_4$); $^{29}$Si-NMR: δ=−25.5. Main isomer: $^1$H-NMR ([D$_8$]toluene, −40° C.): δ=0.81, 0.95 (s, 3H, SiCH$_3$), 1.17 (m, 4H, β-CH$_2$), 1.52 (s, 9H, C(CH$_3$)$_3$, 2.02 (s, 6H, C$_5$Me$_4$), 2.11, 2.54 (s, 3H, C$_5$Me$_4$), 3.47, 3.85 (br m, 2H, α-CH$_2$), 5.27 (t, 1H, $^1$J(Y, H)=29.0 Hz, YHY); $^{13}$C-NMR ([D$_8$]toluene, −40° C.): δ=8.2, 9.3 (SiCH$_3$), 12.1, 12.3, 13.9, 14.7 (C$_5$Me$_4$), 25.0 (β-CH$_2$), 36.3 (C(CH$_3$)$_3$, 54.7 (C(CH$_3$)$_3$), 72.7 (α-CH$_2$), 107.1 (C$_5$Me$_4$ C—SiCH$_3$), 119.6, 122.8, 126.0, 126.2 (C$_5$Me$_4$); 29Si-NMR: δ=−25.6. Secondary isomer: $^1$H-NMR ([D$_8$]toluene, −40° C.): δ=1.20, (m, 4H, β-CH$_2$), 1.44 (s, 9H, C(CH$_3$)$_3$, 2.05, 2.14, 2.20, 2.51 (s, 3H, C$_5$Me$_4$), 3.78 (br m, 4H, α-CH$_2$), 5.45 (t, 1H, $^1$J(Y,H)=28.6 Hz, YHY); $^{13}$C-NMR ([D$_8$]toluene, −40° C.): δ=8.5, 9.0 (SiCH$_3$), 11.2, 11.6, 11.8, 12.4, 13.3, 14.1, 15.2, 15.6 (C$_5$Me$_4$), 24.9 (β-CH$_2$), 36.4 (C(CH$_3$)$_3$), 55.0 (C(CH$_3$)$_3$), 72.4 (α-CH$_2$), 107 (C$_5$Me$_4$ C—SiCH$_3$), 119.9, 123.3, 125.8 (C$_5$Me$_4$); $^{29}$Si-NMR: δ=−25.7.

d) Preparation of {Y[η$^5$:η$^1$-C$_5$Me$_4$SiMe$_2$(N-t-Bu)](μ-CH$_2$CH$_2$CH$_2$CH$_2$CH$_2$CH$_3$)(THF)}$_2$ (Ia)

A 1.0 molar solution of 1-hexene in C$_6$D$_6$ (70 μl) was added to the compound (Ib) obtained as described in I. c) (26 mg) in C$_6$D$_6$ (0.45 ml) and the mixture was stirred for 20 hours at room temperature. The product (Ia) could be obtained in the form of colorless crystals by removal of the solvent.

$^1$H-NMR ([D]toluene): δ=−0.24 (br t, $^1$J$_{H,H}$=9 Hz, 2H, YCH$_2$), 0.74 (s, 6H, SiCH$_3$), 0.90 (t, 3J$_{HH}$=7.2 Hz, 3H, CH$_2$CH$_2$CH$_2$CH$_2$CH$_2$CH$_3$), 1.2–1.3 (m, 4H, CH$_2$CH$_2$CH$_2$CH$_2$CH$_2$CH$_3$), 1.28 (s, 9H, C(CH$_3$)$_3$), 1.42 (m, 4H, CH$_2$CH$_2$CH$_2$CH$_2$CH$_2$CH$_3$), 1.43 (br s, 4H, β-CH$_2$, THF), 1.95, 2.46 (s, 6H, C$_5$Me$_4$), 3.62 (br S, 4H, α-CH$_2$); $^{13}$C-NMR ([D$_8$]toluene): δ=8.2 (NSiCH$_3$), 11.6, 14.5 (C$_5$Me$_4$), 14.1 (CH$_2$CH$_2$CH$_2$CH$_2$CH$_2$CH$_3$), 22.7 (CH$_2$CH$_2$CH$_2$CH$_2$CH$_2$CH$_3$), 25.1 (β-CH$_2$, THF), 28.3 (CH$_2$CH$_2$CH$_2$CH$_2$CH$_2$CH$_3$), 31.5 (CH$_2$CH$_2$CH$_2$CH$_2$CH$_2$CH$_3$), 36.2 (C(CH$_3$)$_3$), 36.9 (CH$_2$CH$_2$CH$_2$CH$_2$CH$_2$CH$_3$), 39.8 (t, $^1$J$_{YC}$=21.9 Hz, YCH$_2$), 54.3 (C(CH$_3$)$_3$, 106.3 (C$_5$Me$_4$C—SiCH$_3$), 121.8, 126.2 (C$_5$Me$_4$); $^{29}$Si-NMR: δ=−24.9.

e) Preparation of {Er[η$^5$:η$^1$-C$_5$Me$_4$SiMe$_2$(NCMe$_2$Et)](THF)(μ-H)}$_2$ Anhydrous erbium trichloride (821 mg) was stirred in THF at 60° C. for 30 minutes. After removal of the solvent under reduced pressure, the solid obtained was suspended in hexane (24 ml), admixed at −78° C. with LiCH$_2$SiMe$_3$ (866 mg) in hexane (24 ml) and stirred at 0° C. for 45 minutes. The mixture obtained was treated with ultrasound and stirred at room temperature for 15 minutes. The solution was separated from an oily residue, admixed at 0° C. with (C$_5$Me$_4$H)SiMe$_2$(NHCMe$_2$Et) (754 mg) and the reaction mixture was stirred at this temperature for 20 minutes and at room temperature for a further 20 minutes and was filtered. Phenylsilane (1.5 mol) was added to the filtrate, the mixture was stirred at room temperature for 16 hours and the colorless solid was isolated by means of decantation. After washing with hexane (2×5 ml), the solid was obtained in a yield of 35%.

f) Preparation of {Tb[η$^5$:η$^1$-C$_5$Me$_4$SiMe$_2$(NCMe$_2$Et)](THF)(μ-H)}$_2$ The preparation was carried out using a method analogous to I.e). However, ultrasound treatment was not necessary.

g) Preparation of {Y[η$^5$:η$^1$-C$_5$Me$_4$SiMe$_2$(NCMe$_2$Et)](THF)(μ-H)}$_2$ The preparation was carried out using a method analogous to I.a)–e).

II. Polymerization of Styrene

1-Hexene (18 mg) was added to the compound (Ib) obtained as described in I.c), I.e), I.f.) or I.g) (16 mg) in C$_6$D$_6$ (0.5 ml) and the mixture was stirred for 1 hour at room temperature. The solvent was removed under reduced pressure and the product obtained was maintained under a reduced pressure of 5×10$^{-3}$ mm of Hg for 1 hour. Subsequently, under atmospheric pressure, benzene (1.5 ml) and styrene (0.25 ml) were introduced into the reaction vessel under an argon atmosphere and the mixture was stirred for a particular time at the prescribed temperature. The solvent was removed under reduced pressure and the polymer product was obtained in pure form by dissolution in chloroform (2 ml) and precipitation in methanol (100 ml) and washing with methanol.

Further information regarding reaction and product parameters may be found in Table 1 below.

III. Block Copolymerization of Styrene and t-butyl Acrylate

Examples III.1 to III.5

The compound (Ib) obtained as described in I.c) (Table 2) dissolved in toluene (3 ml) was admixed with twice its molar amount of 1-hexene and the mixture was stirred at 40° C. for 2 hours. The solvent was removed under reduced pressure and the product obtained was maintained at a reduced pressure of 5×10$^{-3}$ mm of Hg for 1 hour. Subsequently, at atmospheric pressure, benzene (3 ml) and the indicated amount of styrene (Table 2) were introduced into the reaction vessel under an argon atmosphere and the mixture was stirred at the prescribed temperature T$_1$ (25° C.) for 5 hours. The mixture was subsequently diluted with 4 ml of benzene and cooled to the temperature T$_2$. t-Butyl acrylate was added dropwise to this solution. After stirring for another hour, the reaction was stopped by addition of 50 ml of methanol. The solvent was removed under reduced pressure and the polymer product was obtained in pure form by dissolution in chloroform (2 ml) and precipitation in methanol (100 ml) and washing with methanol.

Further information regarding the reaction and product parameters may be found in Table 2.

TABLE 2

| Example | III.1 | III.2 | III.3 | III.4 | 111.5[c] |
|---|---|---|---|---|---|
| Catalyst (Ib) | 64 mg | 80 mg | 80 mg | 64 mg | 18 mg |
| Styrene | 0.5 g | 0.87 g | 0.52 g | 0.24 g | 0.58 g |
| t-Butyl acrylate | 1.8 g | 0.9 g | 1.8 g | 0.9 g | 0.9 g |
| T$_2$ | 5° C. | −40° C. | −15° C. | −25° C. | 5° C. |
| Yield | 0.3 g | 1.1 g | 1.8 g | 1.1 g | 1.1 g |
| M$_n$ (polystyrene block) | n.d. | n.d. | n.d. | n.d. | 18,300 |
| M$_n$ (total) | 10,100 | 10,500 | 14,400 | 4,800 | 29,400 |
| M$_w$/M$_n$ (total) | 1.71 | 2.1 | 1.61 | 1.2 | 1.21 |
| T$_{g1}$ [° C.][a] | 41.5 | 43.8 | 45.2 | 43.5 | n.d. |
| T$_{g2}$ [° C.][b] | 89.1 | 90.5 | 88.7 | 85.7 | n.d. |

[a]T$_{g1}$: Glass transition temperature of the polystyrene block;
[b]T$_{g2}$: Glass transition temperature of the poly-t-butyl acrylate block;
[c]Instead of compound I.c), I.g) served as the starting compound for the polymerization-active complex. Instead of benzene, corresponding amounts of toluene were used. The duration of the styrene polymerization was 16h, and that of the block copolymerization of t-butyl acrylate was 5 min.

We claim:

1. A process for the transition-metal-catalyzed preparation of polymers having a syndiotactic or predominantly syndio-

TABLE 1 b)

| Experiment/ catalyst | Reaction time [h] | Reaction temp. [° C.] | [M$_0$]/[cat][b] | Yield [%] | M$_n$ [10$^3$g/mol] | M$_w$/M$_n$ | rr-triads[a] [%] |
|---|---|---|---|---|---|---|---|
| 1/I.c) | 24 | 25 | 50 | 100 | 24.1 | 1.10 | 70.5 |
| 2/I.c) | 40 | 25 | 115 | 99 | 34.3 | 1.12 | 72.5 |
| 3/I.c) | 72 | 25 | 240 | 90 | 61.3 | 1.23 | n.b. |
| 4/I.c) | 24 | 50 | 130 | 90 | 30.9 | 1.39 | 62.8 |
| 5/I.e)[c] | 19 | 25 | | 86 | 64.2 | 1.30 | n.d. |
| 6/I.e)[c] | 16 | 25 | 150 | 99 | 44.3 | 1.32 | n.d. |
| 7/I.f)[c] | 16 | 25 | 150 | 100 | 35.0 | 1.30 | n.d. |
| 8/I.g)[c] | 20 | 25 | | 88 | 27.3 | 1.07 | n.d. |

[a]determined by means of $^{13}$C-NMR spectroscopy
[b]ratio of initial monomer concentration to catalyst concentration
[c]instead of C$_6$D$_6$ and benzene, corresponding amounts of toluene were used. 1-Octene was used for the initiation.

tactic structure from vinylaromatic monomers, which comprises polymerizing the vinylaromatic monomers and, optionally, further nonpolar α-olefins which are not vinylaromatic monomers in the presence of a transition metal compound of the formula (I)

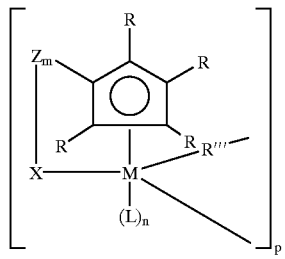

where the substituents and indices have the following meanings:

M is scandium, yttrium, lanthanum or a lanthanide metal,

R is hydrogen, halogen, $C_1$–$C_{20}$-alkyl, $C_3$–$C_{10}$-cycloalkyl, $C_6$–$C_{15}$-aryl or $C_3$–$C_{30}$-organosilyl, where two adjacent radicals R may form a saturated or unsaturated, cyclic or heterocyclic group having from 4 to 18 carbon atoms, Z is —SiR'$_2$—, —CR'$_2$—, —GeR'$_2$—, —SnR'$_2$—, —BR'— or —O—, R' is $C_1$–$C_{20}$-alkyl, $C_3$–$C_{10}$-cycloalkyl, $C_6$–$C_{15}$-aryl or alkylaryl having from 1 to 10 carbon atoms in the alkyl part and from 6 to 10 carbon atoms in the aryl part, X is —O—, —S—, —NR"—, —PR"—, —OR", —SR", —NR"$_2$ or —PR"$_2$, R" is hydrogen, $C_1$–$C_{20}$-alkyl, $C_3$–$C_{10}$-cycloalkyl, $C_6$–$C_{15}$-aryl, alkylaryl having from 1 to 10 carbon atoms in the alkyl part and from 6 to 10 carbon atoms in the aryl part or $C_3$–$C_{30}$-organosilyl, R''' is $\mu$-$C_3$–$C_{20}$-alkyl, p is a natural number greater than 1, L is a low molecular weight, organic compound having Lewis basicity, where n=1 or 0 and at least one n in (I) is 0, m is 1 or 2.

2. A process for the transition-metal-catalyzed preparation of block copolymers, which comprises sequentially block-copolymerizing vinylaromatic monomers and, optionally, further nonpolar α-olefins which are not vinylaromatic monomers together with olefinically unsaturated polar monomers in the presence of a transition metal compound of the formula (I) as claimed in claim 1.

3. A process as claimed in claim 2, wherein the block formed by vinylaromatic monomers has a syndiotactic or a predominantly syndiotactic structure.

4. A process as claimed in claim 1, wherein the vinylaromatic monomers used are compounds of the formula (III)

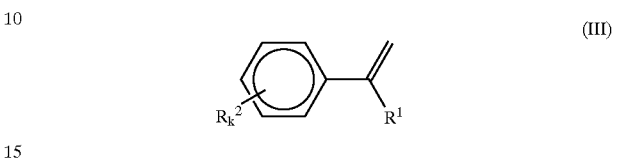

where the radical $R^1$ is hydrogen, $C_1$–$C_8$-alkyl or a halogen atom and $R^2$ is $C_1$–$C_8$-alkyl or a halogen atom and k is 0, 1, 2 or 3.

5. A process as claimed in claim 2, wherein the α-olefinically unsaturated polar monomers used are vinyl cyanides, acrylic acid, the $C_1$–$C_{20}$-alkyl or $C_6$–$C_{15}$-aryl esters of acrylic acid, methacrylic acid, the $C_1$–$C_{20}$-alkyl or $C_6$–$C_{15}$-aryl esters of methacrylic acid or mixtures thereof.

6. A process as claimed in claim 1, wherein the transition metal compound (I) used is one in which the substituents and indices have the following meanings:

M is terbium, erbium or yttrium,

R is $C_1$–$C_{10}$-alkyl or $C_3$–$C_{21}$-organosilyl, where two adjacent radicals R may form a fused-on aromatic ring, Z is —SiR'$_2$— or —CR'$_2$—, R' is $C_1$–$C_{10}$-alkyl or $C_6$–$C_{10}$-aryl, m is 1, X is —NR"— or —PR"—, R" is $C_1$–$C_{10}$-alkyl, $C_6$–$C_{10}$-aryl or alkylaryl having from 1 to 6 carbon atoms in the alkyl part and from 6 to 10 carbon atoms in the aryl part and R''' is m-$C_4$–$C_{10}$-alkyl, p is a natural number greater than 1, L is tetrahydrofuran, a 2,5-dialkyltetrahydrofuran, dioxane, a dialkyl ether, acetonitrile, a triarylphosphine or halogenated triarylphosphine.

7. A process as claimed in claim 1, wherein p=2.

* * * * *

UNITED STATES PATENT AND TRADEMARK OFFICE
CERTIFICATE OF CORRECTION

PATENT NO.      : 6,599,996 B1
DATED           : July 29, 2003
INVENTOR(S)     : Gepraegs et al.

It is certified that error appears in the above-identified patent and that said Letters Patent is hereby corrected as shown below:

<u>Column 14,</u>
Line 40, "R' is m-$C_4$-$C_{10}$-alkyl" should be -- R'" is $\mu$-$C_4$-$C_{10}$-alkyl --.

Signed and Sealed this

Fourteenth Day of October, 2003

JAMES E. ROGAN
*Director of the United States Patent and Trademark Office*